Patented Feb. 14, 1950

2,497,399

UNITED STATES PATENT OFFICE 2,497,399

METHOD OF PRESERVING UNPOPPED POPCORN AT OPTIMUM MOISTURE CONTENT

Stephen T. Dexter, East Lansing, Mich., assignor to Michigan State Board of Agriculture, East Lansing, Mich., a corporation of Michigan No Drawing. Application September 13, 1946, Serial No. 696,934

1 Claim. (Cl. 99—154)

This invention relates to the maintenance of the optimum moisture content in certain types of vegetable products.

Certain types of vegetable products, such as unpopped popcorn, tobacco, etc., can be stored for indefinite periods under ordinary atmospheric conditions without appreciable deterioration, but unless the optimum moisture content is maintained, or is restored just prior to use, certain qualities of the products are temporarily affected. For instance, popcorn does not pop well unless at the time it is popped it contains approximately 14% moisture. I have discovered that popcorn can be maintained at the best popping condition or restored to that condition by storing it in a closed container in which the atmosphere is maintained at opproximately 75% relative humidity. This relative humidity can be maintained throughout a wide range of temperatures by placing in the container a saturated solution of common table salt.

Accordingly, it is the principal object of the present invention to provide a method of preserving vegetable products at optimum moisture content by means of a saturated solution of a solute which has the property of maintaining within a closed container a relative humidity which will keep the vegetable product at its optimum moisture content.

Popcorn in its unpopped condition pops best when the moisture content is between 13.2% and 13.7%. If the moisture content is substantially below or above these values the volume of the corn after popping is many times less than the popping volume when stored under perfect conditions. Furthermore, the number of unpopped kernels is substantially greater when the unpopped corn does not contain its optimum amount of moisture.

To produce and maintain this optimum moisture content a relative humidity of very nearly 75% at ordinary temperatures is necessary. This relative humidity can be automatically maintained by means of a saturated solution of common table salt in which the total quantity of water in the solution is in excess of that required to keep the atmosphere at the requisite relative humidity. This is an inherent characteristic of sodium chloride. If the atmosphere is too dry at the time the popcorn is stored, the moisture evaporates from the solution until a state of equilibrium is reached, at which time the resulting relative humidity of the atmosphere is very nearly 75%.

When the popcorn is stored in relatively small quantities the desired conditions can be effected by placing in the container a large piece of blotting paper soaked in a saturated solution of sodium chloride. Where relatively large quantities are stored, other means of introducing the salt solution into the container can be utilized. It is, of course, essential that the popcorn not come in contact with the solution.

Not only can the optimum moisture content be maintained in this manner, but if the popcorn is too dry at the time it is stored, the proper condition of the popcorn can be restored in the aforementioned manner. It may take a matter of a few hours to a few days to restore the popcorn to its best popping condition, depending upon the quantity stored and its initial moisture content.

Tests of this invention have shown excellent results. A sample from a quantity of popcorn which had been stored under ordinary conditions for approximately 10 years and containing approximately 9% moisture at the time it was used had a very poor popping quality. Another sample of the same popcorn was then stored for a period of two weeks in an atmosphere containing a saturated solution of sodium chloride. At the end of two weeks the moisture content of the corn was 13.7%. After popping, the popping volume of the corn was 26 times the popping volume of the sample not so treated. 98% of the corn in the treated sample popped. Still another sample was stored for a year in an atmosphere containing a saturated solution of sodium chloride and at the end of the year the popping volume was the same as the sample treated only two weeks.

Another sample of a different variety of popcorn originally containing 9.9% moisture was stored in an atmosphere containing a saturated solution of sodium chloride, and at the end of 19 days contained 13.7% moisture. The popping volume of this type of corn was 27.5 times the volume of the dry corn.

Other vegetable products, such as tobacco, can be stored in a similar manner and thereby preserve the optimum moisture content. It is necessary only to determine at what relative humidity the particular product should be stored for best results and then provide a saturated solution of a solute which will provide the desired humidity conditions. The particular solute employed can be obtained from tables dealing with vapor pressures and relative humidities, such as "International Critical Tables" and "Landolt-Bornstein."

From the foregoing it will be seen that the present invention provides an extremely simple and effective method of automatically maintaining or restoring and maintaining the optimum moisture content in certain vegetable products.

The scope of the invention is indicated in the appended claim.

The method of preserving unpopped pop corn at optimum moisture content which comprises storing said pop corn in a closed container in which the atmosphere in the container is exposed to a saturated aqueous solution of sodium chloride, the quantity of water in the solution being more than sufficient to maintain a condition of equilibrium with the atmosphere in the container.

STEPHEN T. DEXTER.

REFERENCES CITED

The following references are of record in the file of this patent:

UNITED STATES PATENTS

| Number | Name | Date |
|---|---|---|
| 1,596,883 | Le Claire | Aug. 24, 1926 |
| 1,938,981 | Smith | Dec. 12, 1939 |
| 2,193,622 | Coulter | Mar. 12, 1940 |

FOREIGN PATENTS

| Number | Country | Date |
|---|---|---|
| 350,780 | Great Britain | Of 1931 |
| 418,682 | Great Britain | Of 1934 |
| 526,952 | Great Britain | Of 1940 |